United States Patent
Hern (10) Patent No.: US 11,761,684 B2
(45) Date of Patent: Sep. 19, 2023

(54) SYSTEMS FOR DETECTING AND POSITIONING OF REVERSING VALVE

(71) Applicant: Johnson Controls Technology Company, Auburn Hills, MI (US)

(72) Inventor: Shawn A. Hern, Derby, KS (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 177 days.

(21) Appl. No.: 17/093,448

(22) Filed: Nov. 9, 2020

(65) Prior Publication Data

US 2021/0055021 A1 Feb. 25, 2021

Related U.S. Application Data

(63) Continuation of application No. 15/965,543, filed on Apr. 27, 2018, now Pat. No. 10,830,501.

(60) Provisional application No. 62/662,599, filed on Apr. 25, 2018.

(51) Int. Cl.
*F25B 13/00* (2006.01)
*G05B 19/042* (2006.01)
*F24F 11/30* (2018.01)
*G05D 23/19* (2006.01)

(52) U.S. Cl.
CPC .............. *F25B 13/00* (2013.01); *F24F 11/30* (2018.01); *G05B 19/042* (2013.01); *G05D 23/1931* (2013.01)

(58) Field of Classification Search
CPC ............ F25B 47/025; F25B 2313/0292; F25B 2313/02792; F25B 2313/02741
See application file for complete search history.

(56) References Cited

U.S. PATENT DOCUMENTS

| 4,211,089 | A | 7/1980 | Mueller et al. |
| 4,487,031 | A * | 12/1984 | Rogers ...................... F25B 5/00 62/228.3 |
| 5,042,264 | A | 8/1991 | Dudley |
| 8,408,018 | B2 * | 4/2013 | Takegami ............. F25B 49/022 62/468 |
| 9,669,498 | B2 | 6/2017 | Pham |
| 10,345,004 | B1 | 7/2019 | Hern et al. |
| 2004/0112082 | A1 * | 6/2004 | Tanimoto ................ F25B 13/00 62/510 |
| 2008/0034765 | A1 * | 2/2008 | Takegami ............... F25B 41/26 62/175 |

(Continued)

FOREIGN PATENT DOCUMENTS

JP 2013164238 A * 8/2013 ............. F25B 13/00

*Primary Examiner* — Nelson J Nieves
(74) *Attorney, Agent, or Firm* — Fletcher Yoder, PC (57) ABSTRACT

A heating and cooling system includes a reversing valve configured to adjust a flow of refrigerant through the heating and cooling system, where the reversing valve includes a first configuration to flow the refrigerant through a first circuit of the heating and cooling system and a second configuration to flow the refrigerant through a second circuit of the heating and cooling system. The heating and cooling system also includes a controller configured to determine an operating parameter of a compressor of the heating and cooling system, where the controller is configured to adjust operation of the compressor based on the operating parameter to adjust a position of the reversing valve.

9 Claims, 8 Drawing Sheets

(56) References Cited

U.S. PATENT DOCUMENTS

| | | | |
|---|---|---|---|
| 2009/0031740 A1* | 2/2009 | Douglas | F25B 13/00 |
| | | | 236/92 B |
| 2010/0251738 A1* | 10/2010 | Takegami | F25B 49/022 |
| | | | 62/468 |
| 2012/0279241 A1 | 11/2012 | Ruiz | |
| 2014/0223939 A1 | 8/2014 | Nasuta et al. | |
| 2015/0007591 A1* | 1/2015 | Liu | G01K 13/02 |
| | | | 62/77 |
| 2015/0121946 A1* | 5/2015 | Li | F25B 13/00 |
| | | | 62/470 |
| 2015/0354877 A1* | 12/2015 | Burns | G05B 13/00 |
| | | | 62/190 |
| 2016/0091236 A1* | 3/2016 | Hammond | F25B 13/00 |
| | | | 62/160 |
| 2017/0141709 A1* | 5/2017 | Fukuda | H02P 7/06 |
| 2017/0328594 A1* | 11/2017 | Takeichi | F24F 11/84 |
| 2017/0343227 A1 | 11/2017 | Mowris | |
| 2018/0051922 A1* | 2/2018 | Ochiai | F25B 49/005 |
| 2018/0299173 A1* | 10/2018 | Huang | F25B 41/26 |
| 2020/0072520 A1* | 3/2020 | Zhang | F25B 49/022 |
| 2020/0263916 A1* | 8/2020 | Nakajima | F25B 49/02 |

\* cited by examiner

SYSTEMS FOR DETECTING AND POSITIONING OF REVERSING VALVE

CROSS REFERENCE TO RELATED APPLICATIONS

This is a continuation application of U.S. patent application Ser. No. 15/965,543, entitled "SYSTEMS FOR DETECTING AND POSITIONING OF REVERSING VALVE," filed Apr. 27, 2018, which claims priority from and the benefit of U.S. Provisional Application Ser. No. 62/662,599, entitled "SYSTEMS FOR DETECTING AND POSITIONING OF REVERSING VALVE," filed Apr. 25, 2018, each of which is hereby incorporated by reference in its entirety for all purposes.

BACKGROUND

The present disclosure relates generally to heating, ventilation, and air conditioning (HVAC) systems, and specifically, to detecting and positioning a reversing valve in HVAC systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Environmental control systems are utilized in residential, commercial, and industrial environments to control environmental properties, such as temperature and humidity, for occupants of the respective environments. The environmental control system may control the environmental properties through control of an air flow delivered to and ventilated from the environment. For example, an HVAC system may transfer heat between the air flow and refrigerant flowing through the system. The HVAC system may use a reversing valve that changes position to direct circulation of the refrigerant through the HVAC system. It is now recognized that a reversing valve may not fully shift or change its position to direct the refrigerant as desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating and cooling system includes a reversing valve configured to adjust a flow of refrigerant through the heating and cooling system, where the reversing valve includes a first configuration to flow the refrigerant through a first circuit of the heating and cooling system and a second configuration to flow the refrigerant through a second circuit of the heating and cooling system. The heating and cooling system also includes a controller configured to determine an operating parameter of a compressor of the heating and cooling system, where the controller is configured to adjust operation of the compressor based on the operating parameter to adjust a position of the reversing valve.

In one embodiment, a heating and cooling system includes a compressor, a reversing valve, and a controller. The compressor is configured to pressurize a refrigerant flowing through a refrigerant circuit of the heating and cooling system, where the refrigerant circuit comprises a first flow path and a second flow path. Additionally, the reversing valve is configured to adjust flow of the refrigerant through the refrigerant circuit, where the reversing valve includes a first configuration to direct the refrigerant through the first flow path and a second configuration to direct the refrigerant through the second flow path. Furthermore, the controller is configured to determine an operating parameter of the compressor, where the controller is configured to adjust operation of the compressor based on the operating parameter to adjust a position of the reversing valve.

In one embodiment, a heating and cooling system includes a reversing valve configured to direct refrigerant through a refrigerant circuit of the heating and cooling system, where the refrigerant circuit includes a first flow path and a second flow path and where the reversing valve includes an internal slider configured to transition between a first position to direct the refrigerant through the first flow path and a second position to direct the refrigerant through the second flow path. The heating and cooling system also includes a controller configured to determine a pressure differential and/or determine an operating parameter of a motor coupled to a compressor, where the controller is configured to adjust operation of the compressor based on the pressure differential and/or the operating parameter to adjust the internal slider of the reversing valve.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to heating, ventilating, and air conditioning (HVAC) systems that use reversing valves to direct refrigerant through a refrigerant circuit within the HVAC system. For example, the reversing valve may include a set of conduits that the refrigerant flows through and an internal slider within the reversing valve that adjusts, opens, or occludes openings in the set of conduits. Depending on the position of the internal slider, the refrigerant flows through the conduits in a certain manner and along a particular flow path, which results in the refrigerant flowing through the remaining components of the HVAC system in a particular circulation, direction, or flow path.

In some embodiments, the internal slider shifts positions to change operating modes of the HVAC system. For example, during a cooling mode, the internal slider may be at a first position to direct the refrigerant to flow through a first circuit, direction, or flow path of the refrigerant circuit. During a heating mode, the internal slider may be at a second position to direct the refrigerant to flow through a second circuit, direction, or flow path of the refrigerant circuit. The internal slider may be shifted via pressure differential and/or mass flow from the refrigerant. For example, the reversing valve may be coupled to a solenoid valve. The solenoid valve is configured to direct a portion of pressurized refrigerant to flow from the compressor into the reversing valve. During an energized state of the reversing valve, when the solenoid valve is actuated via electricity, the portion of the refrigerant flows into the reversing valve at a first side, and the pressurized refrigerant pushes against the internal slider to shift the internal slider into a first position. During a relaxed state of the reversing valve, when the solenoid valve is not actuated, the refrigerant flows into the reversing valve at a second side, which may be opposite or substantially opposite to the first side, and the pressurized refrigerant pushes against the internal slider to shift the internal slider into a second position away from the first position. However, if the flow of the refrigerant or the pressure differential of the refrigerant is low, the pressurized refrigerant may not fully shift the internal slider into proper position to direct the refrigerant as desired. For example, when the compressor is operating at a slow speed and/or a low stage, the mass flow and/or the pressure of the refrigerant may not be high enough to shift the internal slider. This may result in inefficient operations of the HVAC system.

Thus, in accordance with certain embodiments of the present disclosure, it is presently recognized that detecting the position of the internal slider and automatically adjusting the internal slider when the position is not fully shifted may increase the efficiency of the HVAC system. Specifically, monitoring compressor operating parameters, such as pressure differential and compressor motor parameters, may enable a determination of whether the internal slider is in the desired or proper position in a manner that is faster and more accurate than traditional methods, such as methods that utilize monitoring of temperature of air flow and/or refrigerant. In other words, operation of the compressor may be adjusted or modified based on an operating parameter of the compressor to adjust the internal slider of the reversing valve. As used herein, "based on" includes embodiments in which operation of the compressor is adjusted or modified based at least in part on an operating parameter of the compressor to adjust the internal slider of the reversing valve. For example, if the compressor operating parameters are below corresponding threshold values, further action may be performed to shift the internal slider into the desired position. In some embodiments, the compressor operation is increased. As used herein, increasing the compressor operation includes adjusting the compressor operations such that the mass flow and/or pressure of refrigerant discharged from the compressor increases.

Figure 1:
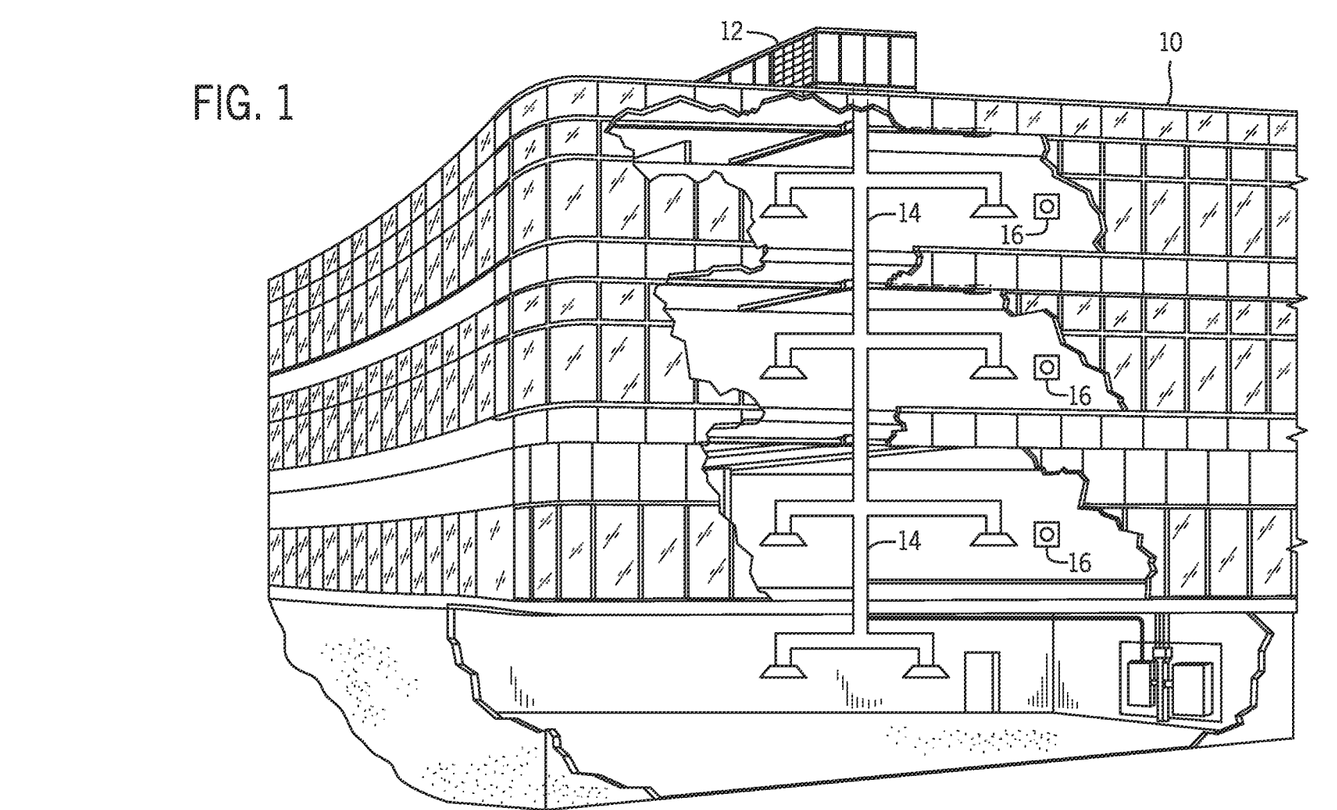
FIG. 1 is a schematic of an environmental control for building environmental management that may employ one or more HVAC units, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
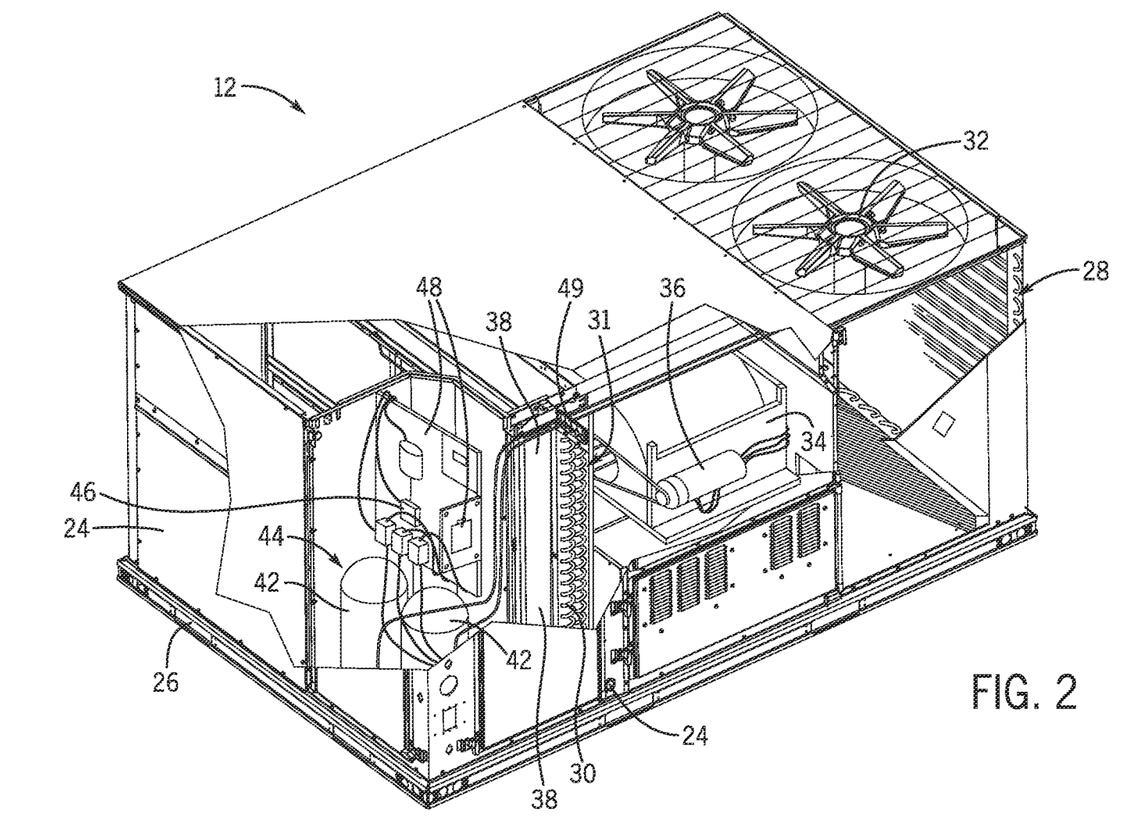
FIG. 2 is a perspective view of an embodiment of the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
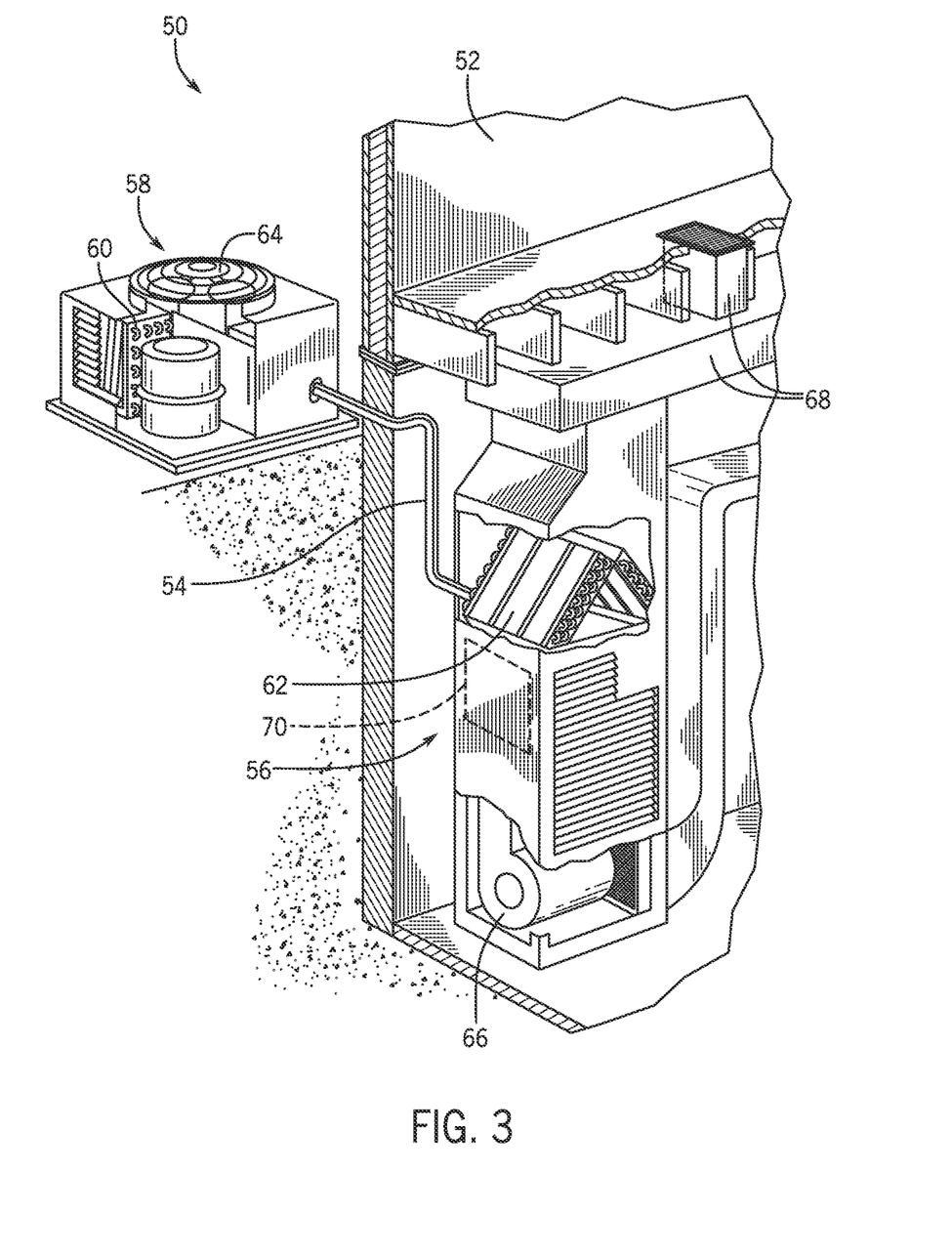
FIG. 3 is a schematic of a residential heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
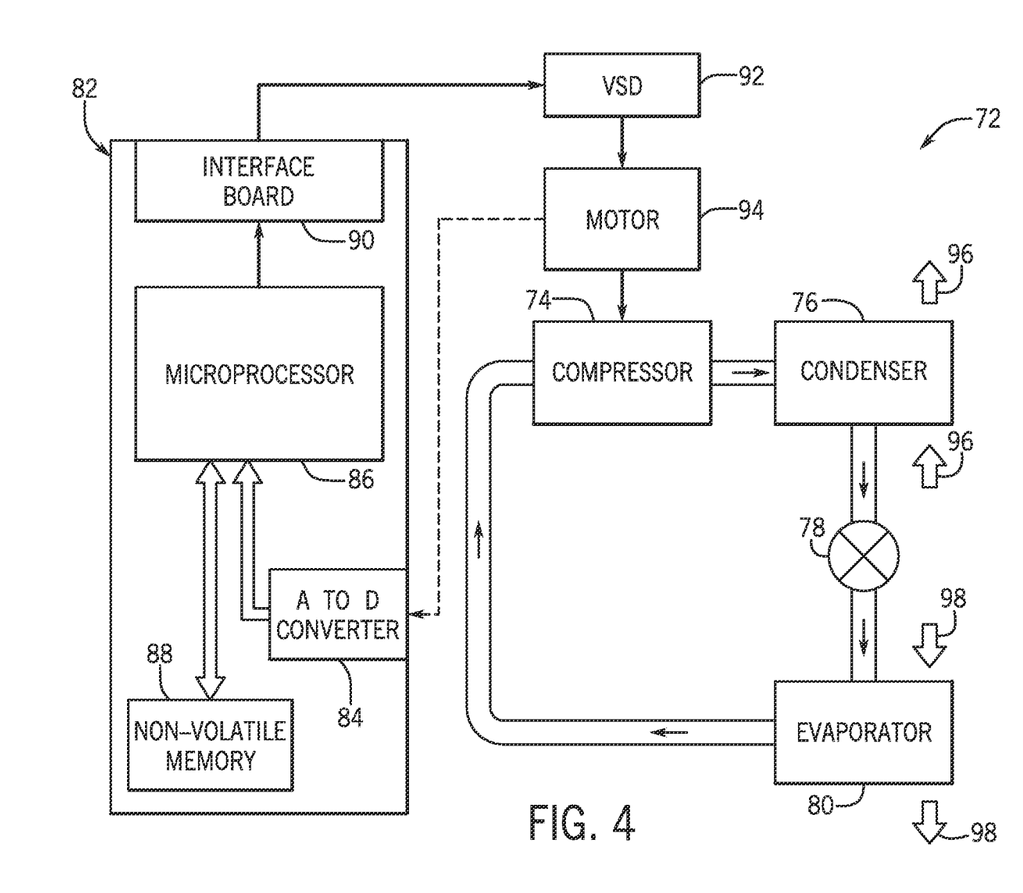
FIG. 4 is a schematic of an embodiment of a vapor compression system that can be used in any of the systems of FIGS. 1-3, in accordance with an aspect the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As noted above, an HVAC system, such as the HVAC system of FIGS. 1-4, may use reversing valves to direct refrigerant through the HVAC system. The reversing valves may use an internal slider that shifts position to direct the refrigerant in a proper or desired manner. In some embodiments, the reversing valve uses a portion of pressurized refrigerant to shift the internal slider to the desired position. However, in some instances, the pressure and/or mass flow of the pressurized refrigerant may not be high enough to push against the internal slider to fully shift the internal slider into the desired position. When the internal slider is not in the desired position, certain compressor operating parameters may be below a certain value. By monitoring such compressor operating parameters, it may be determined if the internal slider is fully shifted into the proper or desired position. If the internal slider is not in the desired position, compressor operations may be adjusted, such as to enhance discharged refrigerant to further shift the internal slider. For example, enhancing discharged refrigerant includes an increasing pressure and/or increasing mass flow.

Figure 5:
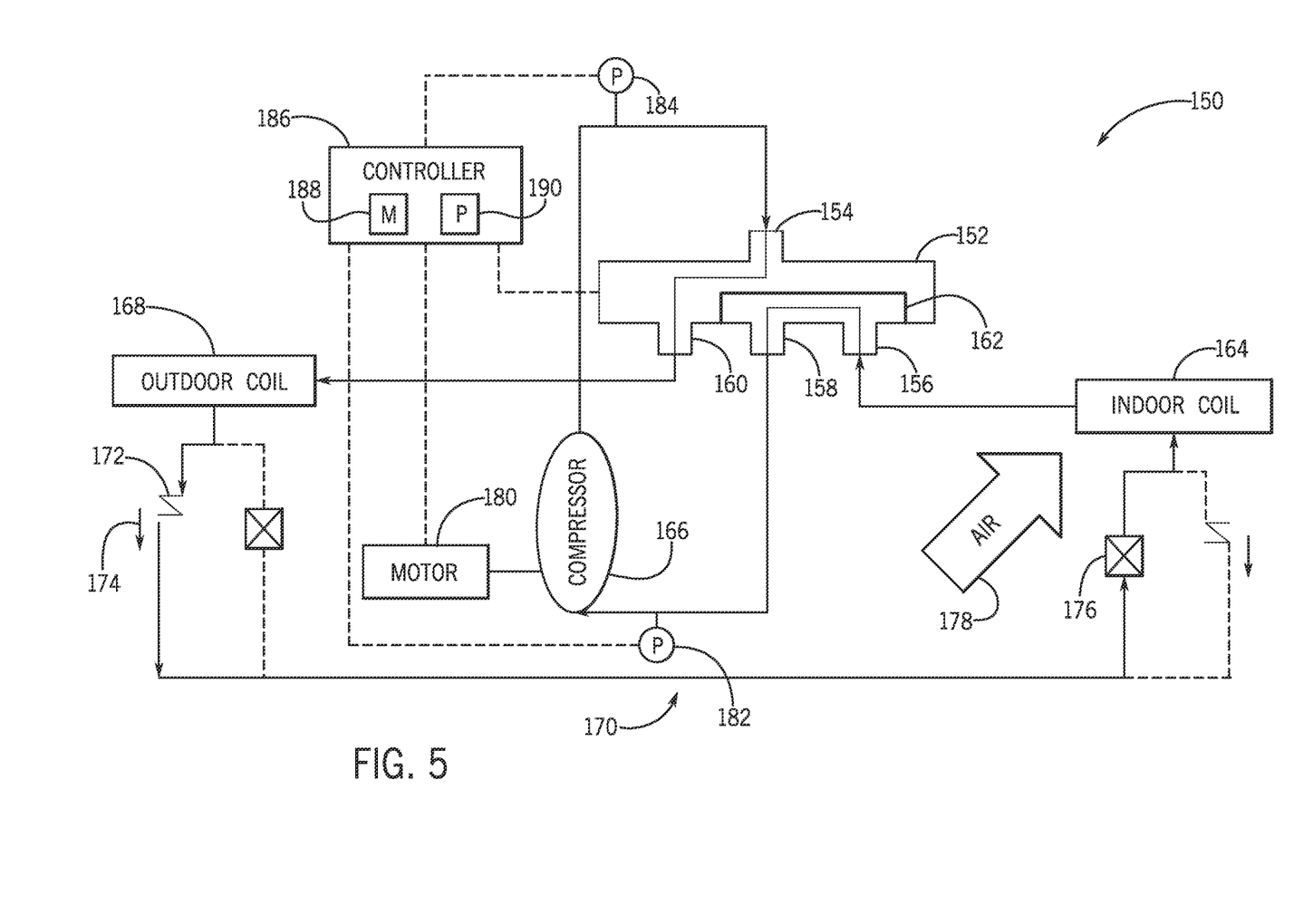
FIG. 5 is a schematic of an embodiment of an HVAC system that uses a reversing valve and is configured to monitor pressure differentials, in accordance with an aspect the present disclosure.

To illustrate an HVAC system using a reversing valve with the disclosed techniques, FIG. 5 is a schematic of an embodiment of an HVAC system 150 that includes a reversing valve 152. As illustrated by FIG. 5, the HVAC system 150 is in a cooling mode. The reversing valve 152 includes a first conduit 154, a second conduit 156, a third conduit 158, and a fourth conduit 160. The reversing valve 152 also includes an internal slider 162, or other suitable shifting mechanism, that is configured to shift positions to occlude and/or open a combination of the second conduit 156, third conduit 158, and fourth conduit 160. When in the cooling mode, the reversing valve 152 covers or occludes the second conduit 156 and the third conduit 158, thereby separating the second conduit 156 and third conduit 158 from the first conduit 154 and fourth conduit 160 within the reversing valve 152. As a result, refrigerant flows from an indoor coil 164 into the reversing valve 152 through the second conduit 156, where the refrigerant is directed by the internal slider 162 to flow out of the third conduit 158 into an inlet of a compressor 166. The compressor 166 pressurizes the refrigerant, effectively heating the refrigerant, then discharges the heated, pressurized refrigerant from an outlet of the compressor 166 into the reversing valve 152 through the first conduit 154. The refrigerant then flows out of the reversing valve 152 via the fourth conduit 160 and into an outdoor coil 168, where the refrigerant exchanges heat with ambient air. In the cooling mode, the outdoor coil 168 acts as a condenser to cool the refrigerant, where the cooled refrigerant exists the outdoor coil 168 through a cooling circuit 170. In the cooling circuit 170, the refrigerant flows through a check valve 172 configured to flow the refrigerant in a direction 174 and into an expansion valve 176. The expansion valve 176 depressurizes the refrigerant to further cool the refrigerant, before the refrigerant flows into the indoor coil 164. Within the indoor coil 164, air 178 flows through the indoor coil, where the air 178 exchanges heat with the refrigerant to cool the air 178 and heat the refrigerant. The refrigerant then re-enters the reversing valve 152 via the second conduit 156 to restart circulation, and the air 178 flows out of the HVAC system 150 to cool an area fluidly coupled to the HVAC system 150, such as a room or a zone of a building.

In some embodiments, the compressor 166 is coupled to a motor 180 configured to change operation of the compressor 166. For example, the motor 180 is configured to change a compressor speed or a compressor stage to increase or decrease pressurization of the discharged refrigerant and/or increase or decrease mass flow of the discharged refrigerant. As a result, the pressure and/or mass flow of the refrigerant entering the reversing valve 152 via the first conduit 154 may be adjusted. Additionally, there may be an upstream pressure sensor 182 positioned upstream of the compressor 166, such as at a low pressure side of the compressor 166, and a downstream pressure sensor 184 positioned downstream of the compressor 166, such as at a high pressure side of the compressor 166. The upstream pressure sensor 182 is configured to detect pressure of the refrigerant prior to flowing into the compressor 166, and the downstream pressure sensor 184 is configured to detect pressure of the refrigerant flowing out of the compressor 166 after compression has occurred.

In some embodiments, the HVAC system 150 includes a controller 186 that is communicatively coupled to the reversing valve 152, the motor 180, the upstream pressure sensor 182, and the downstream pressure sensor 184. The controller 186 may include a memory 188 and a processor 190. The memory 188 may be a mass storage device, a flash memory device, removable memory, or any other non-transitory computer-readable medium that includes instructions for the processor 190 to execute. The memory 188 may also include volatile memory such as randomly accessible memory (RAM) and/or non-volatile memory such as hard disc memory, flash memory, and/or other suitable memory formats. The processor 190 may execute the instructions stored in the memory 188, in order to adjust operations of the motor 180 and/or change the position of the internal slider 162.

In certain embodiments, the controller 186 uses pressure data detected by the upstream pressure sensor 182 and/or the downstream pressure sensor 184 to determine if the internal slider 162 is in the desired or proper position. For example, the controller 186 may be configured to determine if the difference in pressure between the pressure data detected by the upstream pressure sensor 182 and the pressure data detected by the downstream pressure sensor 184 is above a certain pressure threshold value to indicate the internal slider 162 is fully shifted in the desired position. A difference in pressure below the threshold value may indicate the internal slider 162 is not fully shifted into the proper or desired position. For example, if the internal slider 162 is not fully shifted, the refrigerant may not flow as desired within the reversing valve 152 and, thus, the refrigerant is not effectively or efficiently pressurized by the compressor 166. Thus, the controller 186 may detect the inadequate pressure difference and, as a result, adjust operations of the compressor 166 to further shift the internal slider 162. It should be appreciated that in additional or alternative embodiments, pressure sensors may be disposed in the HVAC system 150 in other sections, such as adjacent to the indoor coil 164 and the outdoor coil 168. As such, the controller 186 may determine if the difference in pressure across other sections of the HVAC system is above the pressure threshold value.

Figure 6:
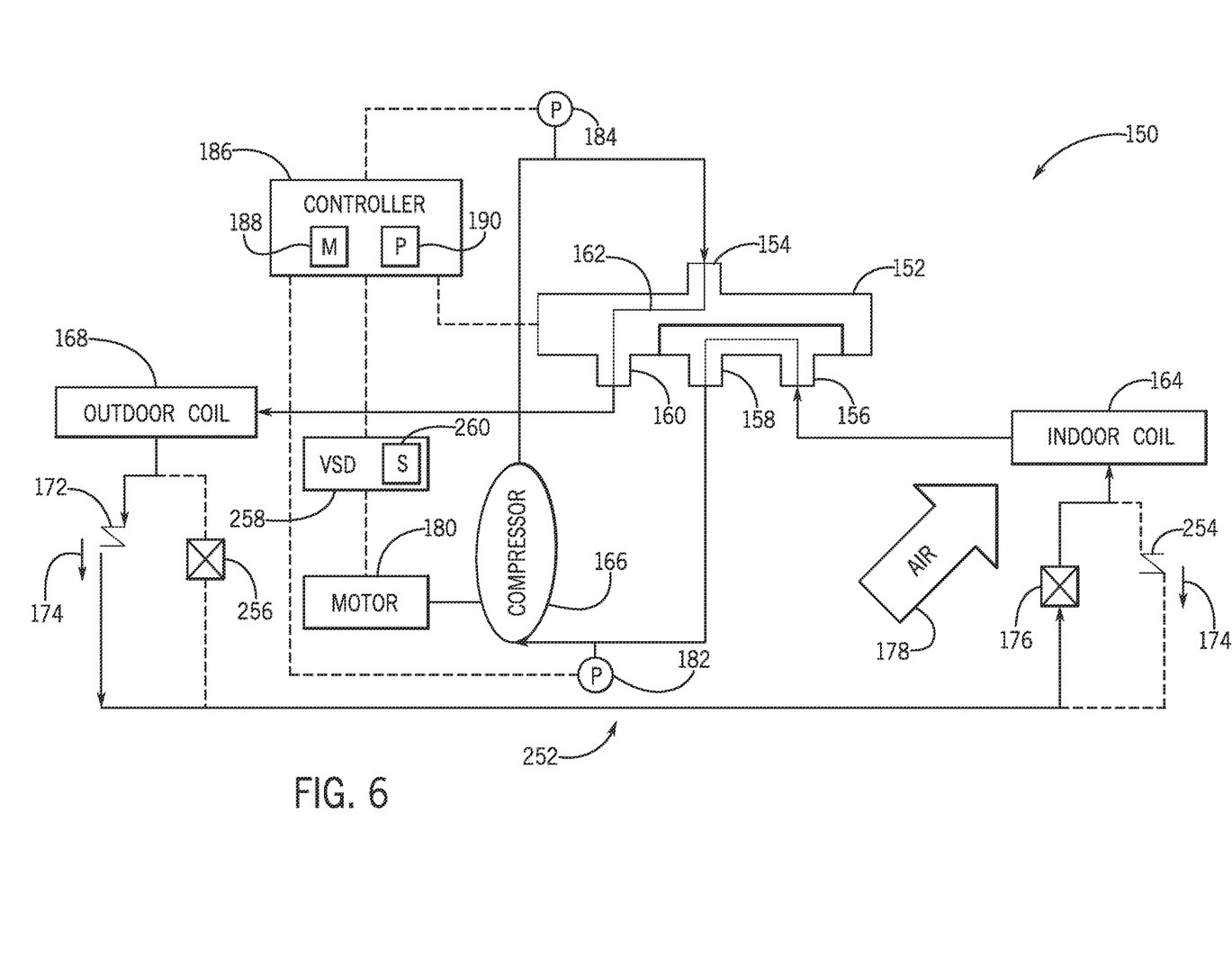
FIG. 6 is a schematic of an embodiment of the HVAC system of FIG. 5 configured to monitor compressor motor parameters, in accordance with an aspect the present disclosure.

In additional or in alternative embodiments, the controller 186 uses other data to determine if the internal slider 162 is in the desired position. FIG. 6 is an embodiment of the HVAC system 150 in a heating mode and configured to use compressor motor parameter data to determine if the internal slider 162 is in the desired position. During the heating mode, the internal slider 162 is positioned such that the third conduit 158 and fourth conduit 160 are separated from the first conduit 154 and the second conduit 156 within the reversing valve 152. Thus, the refrigerant may enter the reversing valve 152 via the fourth conduit 160 and then exits the reversing valve 152 via the third conduit 156. After exiting the reversing valve 152 via the third conduit 158, the refrigerant enters the inlet of the compressor 166, where the refrigerant is pressurized and discharged from the outlet of the compressor 166 into the reversing valve 152 via the first conduit 154 and out of the reversing valve 152 via the second conduit 156 and into the indoor coil 164. In this configuration, the indoor coil 164 acts as the condenser, as the air 178 flowing through the indoor coil 164 exchanges heat with the refrigerant to cool the refrigerant and heat the air 178. The air 178 may then exit the HVAC system 150 to heat an area fluidly coupled to the HVAC system 150. After being cooled, the refrigerant exits the indoor coil 164 through a heating circuit 252. In the heating circuit 252, the refrigerant flows through a check valve 254 configured to flow the refrigerant in the direction 174 to an expansion valve 256 to depressurize the refrigerant. The cooled refrigerant flows through the outdoor coil 168, where the refrigerant exchanges heat with ambient air to heat the refrigerant. The heated refrigerant re-enters the reversing valve 152 via the fourth conduit 160 and exits through the reversing valve 152 via the third conduit 158 to re-enter the inlet of the compressor 166 to restart circulation through the HVAC system 150.

In some embodiments, the controller 186 uses a compressor motor parameter to determine if the internal slider 162 is in the desired position. For example, the controller 186 determines current input into the motor 180, current output from a variable speed drive (VSD) 258 coupled to the motor 180, torque sensed by the motor 180, another compressor motor parameter, or any combination thereof. In some embodiments, the VSD 258, which may be the same or substantially similar to the VSD 92, is configured to adjust operations of the motor 180 and therefore adjust operations of the compressor 166. That is, the VSD 258 is configured to adjust a speed and/or a stage of the operations of the compressor 166. In some embodiments, the VSD 258 includes a sensor 260 configured to detect the compressor motor parameters. As such, the VSD is communicatively coupled to the controller 186 to enable the sensor 260 to transmit data associated with the detected compressor motor parameters. In additional or alternative embodiments, the sensor 260 may be positioned externally to the VSD, such as adjacent to the motor 180 or the compressor 166. The sensor 260 may thus be communicatively coupled to the controller 186 to transmit data to the controller 186.

In some embodiments, the compressor motor parameters are indicative of whether or not the internal slider 162 is fully shifted into the desired position. For example, if the corresponding compressor motor parameters are below respective threshold values, the controller 186 determines the internal slider 162 is not in the desired position and thus, adjusts operations of the compressor 166 to further shift the internal slider 162, such as by increasing the pressure of refrigerant. That is, if the internal slider 162 is not in the desired position, the motor 180 may be operating using a lower compressor motor parameter to operate the compressor 166 in pressurizing the refrigerant. As such, a compressor motor parameter below the threshold value may be indicative of the internal slider 162 in an undesired position.

Figure 7:
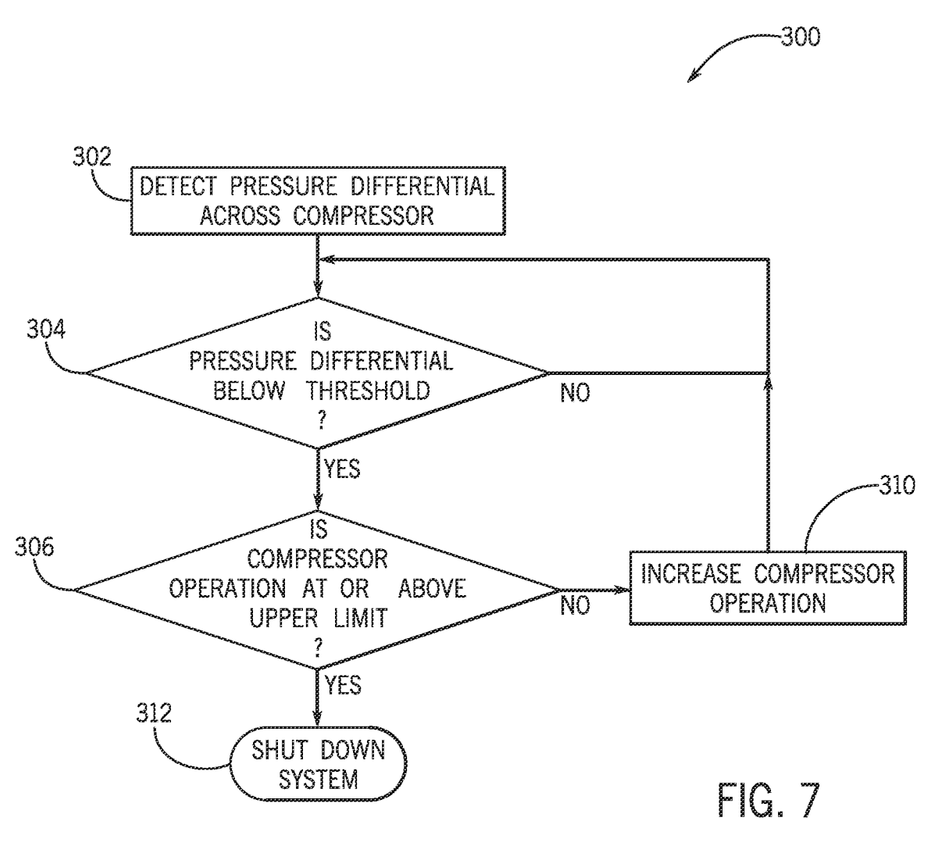
FIG. 7 is a flowchart of an embodiment of a method to determine and adjust a reversing valve via pressure differential, in accordance with an aspect the present disclosure.

To illustrate how the HVAC system 150 may shift the position of the internal slider 162, FIG. 7 is a flowchart of an embodiment of a method 300 of using refrigerant pressure differential for shifting the internal slider 162. At block 302, a pressure differential is detected, such as via the upstream pressure sensor 182 and the downstream pressure sensor 184. The step described at block 302 may continuously be performed during operation of the HVAC system 150, such that the pressure differential 166 is constantly monitored. At block 304, the pressure differential is compared with the threshold value to determine if the pressure differential is below the threshold value. If the pressure differential is not below the threshold value, no adjustment of the operations of the compressor 166 is performed and the pressure differential continues to be monitored. If the pressure differential is determined to be below the threshold value, it is further determined if the compressor 166 is operating at or above an upper limit, as shown at block 306. For example, it may be determined if the compressor 166 is operating at or above a particular speed and/or a particular stage, such as a maximum speed or stage. If the compressor 166 is determined not to be operating at or above the upper limit, the compressor operation is increased, as shown at block 310. That is, a speed of the compressor 166 and/or a stage of the compressor 166 is increased, such as via the VSD 258 and/or the motor 180. As a result, there is an increase of pressure and/or mass flow rate of the refrigerant flowing out of the outlet of the compressor 166 to enter the reversing valve 152, such as via the first conduit 154. The increased pressure and/or mass flow rate of the refrigerant may be considered an enhanced state of the discharged refrigerant. As mentioned above, the increase of pressure and/or mass flow of refrigerant entering the reversing valve 152 may push against the internal slider 162 to further shift the internal slider 162 into the desired position.

After increasing the compressor operation, the pressure differential is again monitored to determine if the pressure differential is below the threshold value. If the pressure differential still remains below the threshold value, the steps of block 304, block 306, and block 310 may be repeated to attempt to further shift the internal valve 162. In certain embodiments, the threshold value may be based on a configuration of the HVAC system 150, such as specifications of the motor 180, the compressor 166, the refrigerant, any other components of the HVAC system 150, or any combination thereof. In additional or alternative embodiments, the threshold value is based off operating parameters of the HVAC system 150, such as if the HVAC system 150 is in a heating and/or cooling mode, based on a desired rate of airflow through the HVAC system 150, based on a desired temperature of air flowing through the HVAC system 150, another suitable operating parameter of the HVAC system 150, or any combination thereof. As such, the threshold value may be adjusted accordingly in HVAC systems 150 of different configurations or even within the same HVAC system 150 based on the operating parameters of the HVAC system 150. In some embodiments, if the pressure differential is determined to be above the threshold value after an increase in compressor operation, the compressor operation may be decreased to return to operation prior to determining that the pressure differential was below the threshold value. That is, the speed and/or the stage of the compressor returns to the speed and/or stage before determining the internal slider 162 was not fully shifted.

In some embodiments, if the compressor operation is determined to be at or above the upper limit, such as a maximum compressor speed, the HVAC system 150 is shut down, as shown at block 312. That is, the compressor operation is not increased, since such an increase may put the compressor 166 in an undesirable state of operation, and the HVAC system 150 may therefore shut down operations. In some embodiments, the HVAC system 150 is flagged, such as to indicate the internal slider 162 is not fully shifted and to indicate that maintenance is to be performed, such as to shift the internal slider 162.

Figure 8:
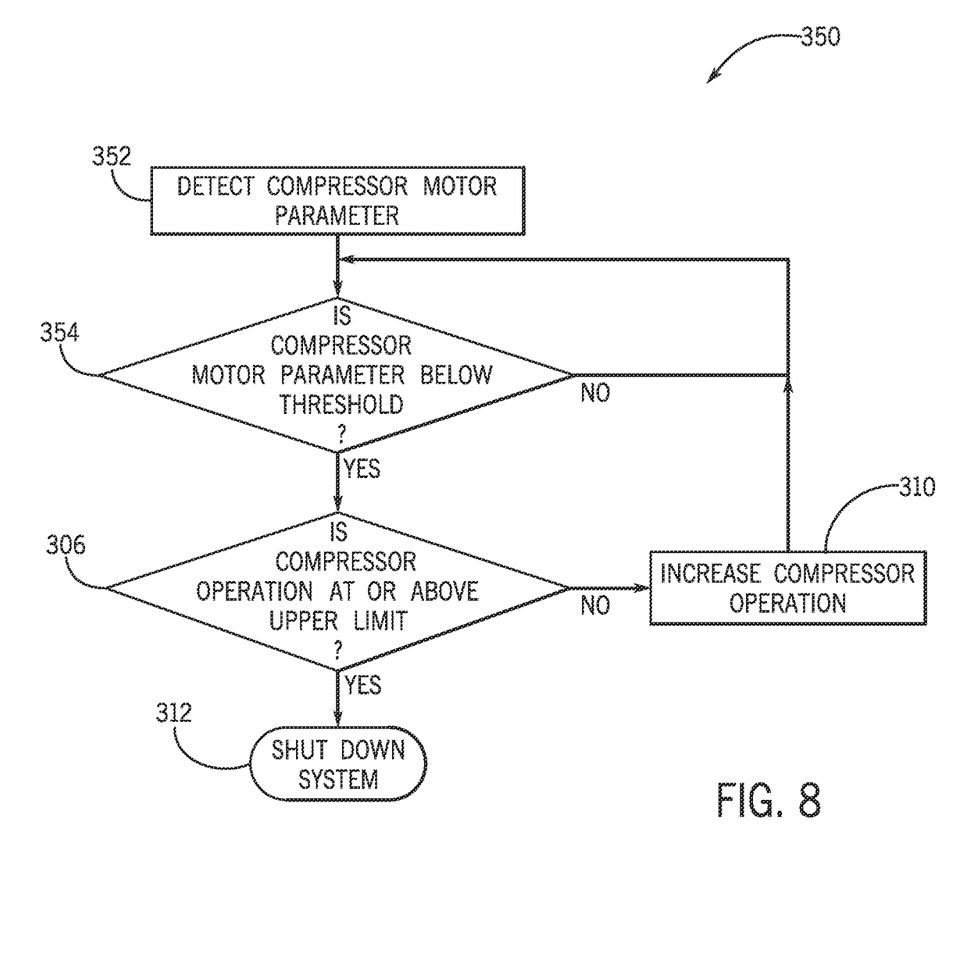
FIG. 8 is a flowchart of an embodiment of a method to determine and adjust a reversing valve via compressor motor parameters, in accordance with an aspect the present disclosure.

Another method may be implemented to shift the position of the internal slider 162, as shown in FIG. 8, which is a flowchart of an embodiment of a method 350 using a compressor motor parameter for shifting the internal slider 162. At block 352, a compressor motor parameter is continuously detected. As noted above, the compressor motor parameter may be an input current into the motor 180, an output current by the VSD 258, a torque sensed by the motor 180, another compressor motor parameter, or any combination thereof. At block 354, it is determined if the compressor motor parameter is below a threshold value. If the compressor motor parameter is determined not to be below the threshold value, operation of the compressor 166 may not be adjusted and the compressor motor parameter continues to be monitored. However, if the compressor motor parameter is determined to be above the threshold value, operation of the compressor 166 is further analyzed to determine if the compressor 166 is operating above an upper limit, as shown at block 306. Similar to the method 300, if the compressor 166 is determined not to be operating above the upper limit, operation of the compressor 166 is increased, as shown in block 310, and the step at block 354 is further performed to determine if the compressor motor parameter remains below the threshold value. If the compressor motor parameter is below the threshold value, the steps of block 354, 306, and 310 may be repeated until the compressor motor parameter is below the threshold value and/or the compressor operation is at or above the upper limit. If the compressor motor parameter is below the threshold value, the compressor operation may cease to increase and, in some embodiments, the compressor operation returns to operation prior to the determination that the compressor motor parameter was below the threshold value. Similar to the method 300, if the compressor operation is at or above the upper limit, such as a maximum speed, the HVAC system 150 may shut down, as shown at block 312, and the HVAC system 150 may be flagged. As with the threshold value associated with pressure differential, the threshold value for compressor motor parameters may be adjusted based on configuration of the HVAC system 150, the operating parameters of the HVAC system 150, another specification of the HVAC system 150, or any combination thereof.

The methods 300 and 350 may be performed by the controller 186, such as by the processor 190. Moreover, the steps of the methods 300 and 350 are not exhaustive and as such, additional steps not previously described may be performed with these techniques. In some embodiments, the methods 300 and 350 may be combined such that both the pressure differential and the compressor motor parameters are used to determine if the internal slider 162 is correctly positioned.

As set forth above, embodiments of the present disclosure may provide one or more technical effects useful in the operation of HVAC systems. For example, the HVAC system uses a reversing valve to control circulation of refrigerant flowing through the HVAC system. The reversing valve may use an internal slider to direct the flow of the refrigerant through the reversing valve and thus, through the remainder of the HVAC system. The present disclosure determines when the internal slider may be positioned incorrectly, such as via pressure differential and/or compressor motor parameters, and upon such determination, adjusts the operation of the compressor to adjust the position of the internal slider. For example, compressor operation, such as compressor speed and/or compressor stage, increases to increase the pressure and/or mass flow of discharged refrigerant to further shift the internal slider into the desired position as the refrigerant flows into the reversing valve. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, mounting arrangements, use of materials, colors, orientations, and the like, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosed embodiments, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and air conditioning (HVAC) system, comprising:
a reversing valve configured to transition between a first configuration and a second configuration, wherein the reversing valve is configured to direct a refrigerant along a first flow path of the HVAC system in the first configuration, and the reversing valve is configured to direct the refrigerant along a second flow path of the HVAC system in the second configuration; and
a controller configured to determine an operating parameter related to a position of the reversing valve, wherein the controller is configured to adjust operation of a compressor of the HVAC system from a first operation to a second operation to adjust the position of the reversing valve in response to a first determination that the operating parameter is below a threshold value, and the controller is configured to adjust operation of the compressor from the second operation to a third operation in response to a second determination that the operating parameter is above the threshold value after the first determination that the operating parameter is below the threshold value.

2. The HVAC system of claim 1, wherein the operating parameter comprises a pressure differential, a current input into a motor configured to drive the compressor, a current output from a variable speed drive (VSD) coupled to the motor, a torque associated with the motor, or any combination thereof.

3. The HVAC system of claim 1, wherein the second operation of the compressor increases a pressure, a mass flow rate, or both of the refrigerant discharged from the compressor, and the third operation of the compressor reduces the pressure, the mass flow rate, or both of the refrigerant discharged from the compressor.

4. The HVAC system of claim 1, wherein the first operation comprises a first speed or a first stage of the compressor, and the second operation comprises a second speed or a second stage of the compressor that is greater than the first speed or the first stage, respectively.

5. The HVAC system of claim 4, wherein the third operation comprises a third speed or a third stage of the compressor that is less than the second speed or the second stage, respectively.

6. The HVAC system of claim 5, wherein the third speed or the third stage is equal to the first speed or the first stage, respectively.

7. The HVAC system of claim 1, wherein the controller is configured to shut down the HVAC system in response to the first determination that the operating parameter is below the threshold value and a third determination that the compressor is operating at an upper limit.

8. The HVAC system of claim 7, wherein the upper limit comprises a maximum speed or a maximum stage of the compressor.

9. The HVAC system of claim 1, wherein the reversing valve is configured to be in the first configuration during a cooling mode of the HVAC system, and the reversing valve is configured to be in the second configuration during a heating mode of the HVAC system.

\* \* \* \* \*